United States Patent
Zhang et al.

(10) Patent No.: US 9,503,243 B2
(45) Date of Patent: Nov. 22, 2016

(54) METHOD AND DEVICE FOR TRANSMITTING CHANNEL STATE INFORMATION

(71) Applicant: CHINA ACADEMY OF TELECOMMUNICATIONS TECHNOLOGY, Beijing (CN)

(72) Inventors: Ranran Zhang, Beijing (CN); Qiubin Gao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 106 days.

(21) Appl. No.: 14/370,033

(22) PCT Filed: Sep. 25, 2012

(86) PCT No.: PCT/CN2012/081925
§ 371 (c)(1),
(2) Date: Jun. 30, 2014

(87) PCT Pub. No.: WO2013/097502
PCT Pub. Date: Jul. 4, 2013

(65) Prior Publication Data
US 2014/0369291 A1  Dec. 18, 2014

(30) Foreign Application Priority Data
Dec. 31, 2011 (CN) .......................... 2011 1 0460423

(51) Int. Cl.
*H04L 5/00* (2006.01)
*H04B 7/06* (2006.01)
(Continued)

(52) U.S. Cl.
CPC .............. *H04L 5/0053* (2013.01); *H04B 7/024* (2013.01); *H04B 7/0626* (2013.01);
(Continued)

(58) Field of Classification Search
CPC .. H04B 7/024; H04B 7/0626; H04B 7/0634; H04B 7/0643; H04L 1/0026; H04L 5/0035; H04L 5/0057
See application file for complete search history.

(56) References Cited

U.S. PATENT DOCUMENTS

| 2011/0170435 A1* | 7/2011 | Kim ...................... H04L 5/0023 370/252 |
| 2013/0114430 A1* | 5/2013 | Koivisto ................ H04B 7/024 370/252 |
| 2014/0247749 A1* | 9/2014 | Kim ...................... H04B 7/024 370/252 |

FOREIGN PATENT DOCUMENTS

| CN | 102255689 A | 11/2011 |
| CN | 102291212 A | 12/2011 |

(Continued)

OTHER PUBLICATIONS

PCT International Search Report for PCT Counterpart Application No. PCT/CN2012/081925, 5 pgs., (Jan. 3, 2013).
(Continued)

*Primary Examiner* — David Oveissi
(74) *Attorney, Agent, or Firm* — Blakely, Sokoloff, Taylor & Zafman LLP

(57) ABSTRACT

Disclosed is a method for transmitting channel state information, for realizing the transmission of channel information which supports CoMP transmission. The method includes: a terminal receiving from a base station control signaling which indicates to the terminal to perform channel information feedback, the control signaling including indication information about a plurality of CSI-RS resources for performing aggregation feedback; the terminal obtaining the plurality of CSI-RS resources based on the indication information to perform channel estimation and constructing a channel matrix according to a PDSCH transmission solution over a preset CSI reference resource, the correlation between the signal over the plurality of CSI-RS resources and the signal of a UERS port and the constructed channel matrix and transmitting the CSI to the base station. Also disclosed is a device for implementing the method.

15 Claims, 3 Drawing Sheets

(51) Int. Cl.
*H04L 1/00* (2006.01)
*H04B 7/02* (2006.01)

(52) U.S. Cl.
CPC ......... *H04B 7/0634* (2013.01); *H04B 7/0643* (2013.01); *H04L 1/0026* (2013.01); *H04L 5/0035* (2013.01); *H04L 5/0048* (2013.01); *H04L 5/0057* (2013.01); *H04B 7/0639* (2013.01)

(56) References Cited

FOREIGN PATENT DOCUMENTS

| CN | 102291839 A | 12/2011 | | |
|---|---|---|---|---|
| CN | 102546110 A | 7/2012 | | |
| CN | EP 2717502 A1 * | 4/2014 | ......... | H04W 72/042 |
| EP | 2 717 502 A1 | 4/2014 | | |
| JP | WO 2013099284 A1 * | 7/2013 | .......... | H04L 5/0057 |
| WO | WO 2011/106457 A2 | 9/2011 | | |

OTHER PUBLICATIONS

European Patent Office Communication enclosing Extended European Search Report for corresponding European Patent Application No. 12863608.1, 6 pages, (Oct. 20, 2014).

* cited by examiner

METHOD AND DEVICE FOR TRANSMITTING CHANNEL STATE INFORMATION

CROSS-REFERENCE TO RELATED APPLICATIONS

This patent application is a U.S. National Stage under 35 U.S.C. §371 of International Application No. PCT/CN2012/081925, filed on Sep. 25, 2012, entitled METHOD AND DEVICE FOR TRANSMITTING CHANNEL STATE INFORMATION, designating the United States, and claiming the benefit of Chinese Patent Application No. 201110460423.8, filed with the Chinese Patent Office on Dec. 31, 2011 and entitled "Method and apparatus for transmitting channel state information", which was incorporated by reference in its entirety.

FIELD

The present invention relates to the field of communications and particularly to a method and apparatus for transmitting channel state information.

BACKGROUND

Same-frequency network deployment is adopted in a Long Term Evolution-Advanced (LTE-A) system to greatly improve the utilization ratio of spectrums while causing serious attenuation of a user signal at a cell edge and also suffering from high interference from another cell, and experience of an edge user will be seriously degraded if the issues of signal attenuation and interference are not handled. The technology of Coordinated Multiple-Point (CoMP) can improve the quality of a signal and also lower inter-cell interference by introducing information interaction and joint transmission between a plurality of cells to thereby greatly improve the performance of data transmission for the cell edge user.

Existing transmission schemes of coordinated multi-point can fall roughly into three categories including Dynamic Point Selection (DPS), Coordinated Beam-Forming (CBF) and Joint Transmission (JT) or can be a hybrid scheme of these three transmission schemes. For example the DPS and the CBF can be combined to select a plurality of points dynamically for coordinated beam-forming. A "point" can be defined as a set of geographically co-located transmit antennas, and different sectors with the same site location correspond to different points.

The system configures different Channel State Information-Reference Signal (CSI-RS) resources so that a User Equipment (UE) can measure downlink channels of respective "points", that is, estimate the downlink channels of the different "points" with use of different CSI-RSs, where a "CSI-RS resource" refers to a combination of a "resource configuration" and a "sub-frame configuration", both of which are configured by higher-layer signaling. It should be noted that the "point" may not be a physical point but may be a virtual point, and each virtual point corresponds to a CSI-RS resource and is consisted of one or more physical points, or a physical point includes a plurality of virtual points.

Channel State Information (CSI) needed for the transmission scheme is fed back after the downlink channels are measured. The various transmission schemes need to be supported by corresponding channel state information. For example, the DPS needs channel state information of a plurality of points, or channel state information of a specific point and CSI-RS index information corresponding to the specific transmission point. The CBF needs channel state information of a transmission point without a limited Rank Indication (RI) and channel state information of other points at the RI=1 in a coordination set. The JT needs channel state information of respective transmission points and relative phase information of the respective transmission points, or joint channel state information of a plurality of transmission points. The "coordination set" is defined as points participating directly and/or indirectly in transmission of data to a user, and a "transmission point" is defined as a point transmitting data directly to the UE.

An aggregated feedback of a plurality of CSI-RS resources can be made in practice, that is, CSI of a joint channel of the plurality of CSI-RS resources can be fed back, wherein the CSI can include an RI, a Pre-coding Matrix Indicator (PMI) and a Channel Quality Indicator (CQI).

However a Physical Downlink Shared Channel (PDSCH) transmission scheme assumed for CSI in the CoMP transmission mode may be defined based upon a UE-Specific Reference Signal (UERS), and the CSI is measured based on a CSI-RS. Consequently it is impossible at present to apply a measurement result based on a CSI-RS to the transmission scheme based on physical downlink shared channel, due to that no feedback in the CoMP transmission mode can be made.

SUMMARY

Embodiments of the invention provide a method and apparatus for transmitting channel state information so as to transmit the channel information in CoMP.

A method for transmitting channel state information, applied to the user equipment side, the method includes:

receiving, by a user equipment, control signaling, from a base station, to instruct the user equipment to feed back channel information, wherein the control signaling includes indication information of a plurality of CSI-RS resources for an aggregated feedback;

performing, by the user equipment, channel estimation based on the plurality of CSI-RS resources obtained from the indication information and constructing a channel matrix according to a result of channel estimation; and determining, by the user equipment, CSI according to a preset PDSCH transmission scheme over a CSI reference resource, a correspondence relationship between signals over the plurality of CSI-RS resources and signals on UERS ports and the constructed channel matrix, and transmitting the CSI to the base station.

A method for transmitting channel state information, applied to the base station side, the method includes:

sending, by a base station, control signaling to a user equipment to instruct the user equipment to feed back channel information, wherein the control signaling includes indication information of a plurality of CSI-RS resources for an aggregated feedback; and receiving, by the base station, CSI from the user equipment for the plurality of CSI-RS resources.

A user equipment includes:

an interface module configured to receive control signaling, from a base station, to instruct the user equipment to feed back channel information, wherein the control signaling includes indication information of a plurality of CSI-RS resources for an aggregated feedback;

a channel estimation module configured to perform channel estimation based on the plurality of CSI-RS resources obtained from the indication information and to construct a channel matrix according to a result of channel estimation;

a CSI determination module configured to determine CSI according to a preset PDSCH transmission scheme over a CSI reference resource, a correspondence relationship between signals over the plurality of CSI-RS resources and signals on UERS ports and the constructed channel matrix, and to instruct the interface module to transmit the CSI to the base station.

A bases station includes:

a sending module configured to send control signaling to a user equipment to instruct the user equipment to feed back channel information, wherein the control signaling includes indication information of a plurality of CSI-RS resources for an aggregated feedback; and a reception module configured to receive CSI from the user equipment for the plurality of CSI-RS resources.

In the embodiments of the invention, initially assumed that PMI and RI feedbacks are configured, and a PDSCH or a UERS signal $a_{k,l}^{(p)}$ transmitted in the (k,l)-th resource element over a UERS resource generates the same result as a signal $\tilde{a}_{k,l}^{(p)}$ transmitted in the (k,l)-th resource element over a CSI-RS resource. Following this assumption, a CSI feedback of a joint channel matrix constructed after a user equipment measures a plurality of CSI-RS resources can be made to thereby support transmission of channel state information in CoMP transmission.

DETAILED DESCRIPTION OF THE EMBODIMENTS

In an embodiment of the invention, initially it is assumed that PMI and RI feedbacks are configured, and a PDSCH or a UERS signal $a_{k,l}^{(p)}$ transmitted in the (k,l)-th resource element over a UERS resource generates the same result as a signal $\tilde{a}_{k,l}^{(p)}$ transmitted in the (k,l)-th resource element over a CSI-RS resource. Following this assumption, a CSI feedback of a joint channel matrix constructed after a user equipment measures a plurality of CSI-RS resources can be made to thereby support transmission of channel state information in CoMP transmission.

This embodiment can be applied to CoMP, so a CSI-RS resource corresponds to a point which is a physical point or a virtual point.

Figure 1:
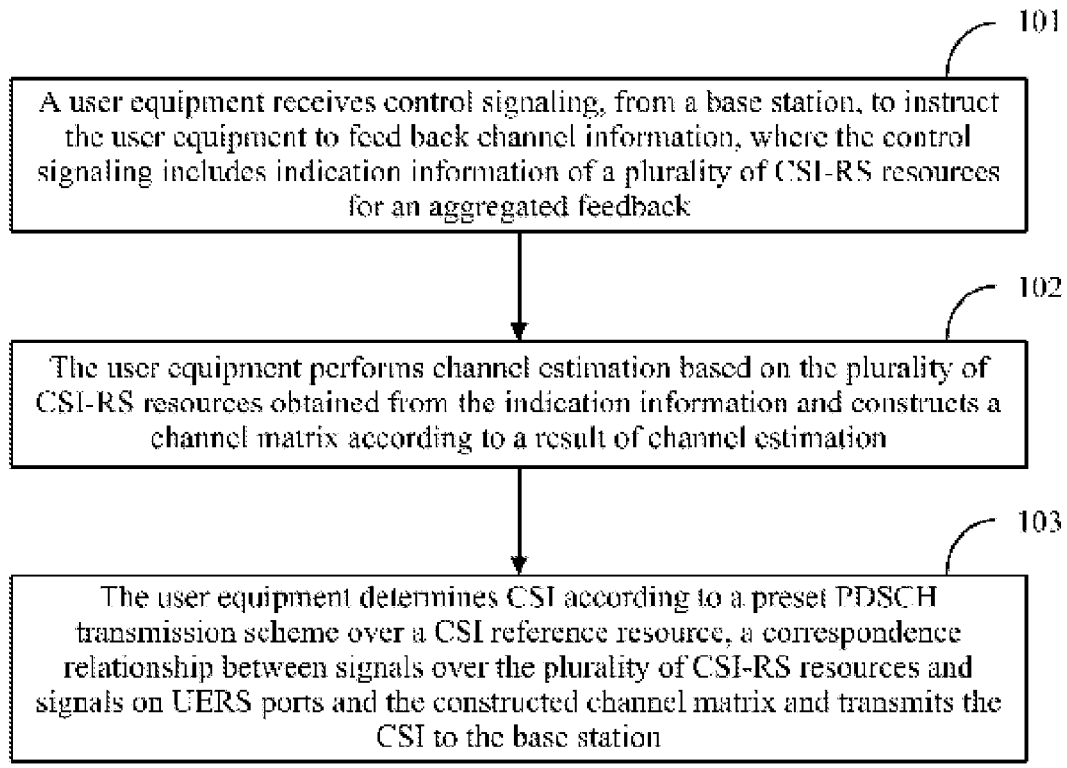
FIG. 1 is a flow chart of a method for transmitting CSI at a user equipment according to an embodiment of the invention.

Referring to FIG. 1, a flow chart of transmitting CSI at a user equipment in this embodiment is as follows:

Step 101: A user equipment receives, from a base station, control signaling to instruct the user equipment to feed back channel information, where the control signaling includes indication information of a plurality of CSI-RS resources for an aggregated feedback. The control signaling can further include feedback mode indication information of the CSI feedback, etc.

Step 102: The user equipment performs channel estimation based on the plurality of CSI-RS resources obtained from the indication information and constructs a channel matrix according to a result of channel estimation.

Step 103: The user equipment determines CSI according to a preset PDSCH transmission scheme over a CSI reference resource, a correspondence relationship between signals over the plurality of CSI-RS resources and signals on UERS ports and the constructed channel matrix, and then the user equipment transmits the CSI to the base station at least for the base station to use the technology of CoMP over a UERS based PDSCH. Specifically the CSI includes a Rank Indication (RI), a Pre-coding Matrix Indicator (PMI) and a Channel Quality Indicator (CQI). An optimum pre-coding matrix is determined by the channel matrix to further determine the PMI, and the RI is determined by a rank corresponding to the determined pre-coding matrix, and the CQI is determined by the PMI and the RI.

Specifically the CSI reference resource can be defined as:

In the frequency domain, the CSI reference resource is consisted of a bandwidth corresponding to a set of downlink physical resource blocks and particularly determined by the feedback mode.

In the time domain, the CSI reference resource is defined by a downlink sub-frame n-$n_{CQI\_ref}$, where n represents the sub-frame for the CSI reporting, and $n_{CQI\_ref}$ is an integer and determined particularly as follows:

For a periodic CSI feedback, $n_{CQI\_ref}$ is the least value which is no less than 4 such that the CSI reference sub-frame is a valid downlink sub-frame;

For an aperiodic CSI feedback triggered by a downlink control signaling for the uplink grant, $n_{CQI\_ref}$ is the difference between the sub-frame containing the downlink control signaling and the subframe for CSI reporting; and For an aperiodic CSI feedback triggered by a random access response, $n_{CQI\_ref}$ is 4 and n-$n_{CQI\_ref}$ corresponds to a valid downlink sub-frame.

In the layer domain, the CSI reference resource is determined by the RI and the PMI based upon which the CQI is calculated.

Assumed that an overhead of a UERS is the same as that of a recently reported RI when PMI and RI feedbacks are configured, then a PDSCH or a UERS signal $a_{k,l}^{(p)}$ transmitted on UERS antenna port $\{7, \ldots, 6+v\}$ (v represents the number of layers and a port number starts with 7) over the (k,l)-th resource element (including time-domain and frequency-domain resources, where k represents a sub-carrier, and l represents an OFDM symbol) generates the same result as a signal $\tilde{a}_{k,l}^{(p)}$ transmitted on CSI-RS antenna port $\{\{15, \ldots, 14+P_1\}^1, \{15, \ldots, 14+P_2\}^2, \ldots, \{15, \ldots, 14+P_N\}^N\}$ over the (k,l)-th resource element, that is, $$\begin{bmatrix} \tilde{a}_{k,l}^{(15,1)} \\ \vdots \\ \tilde{a}_{k,l}^{(14+P_N,N)} \end{bmatrix} = W \begin{bmatrix} a_{k,l}^{(7)} \\ \vdots \\ a_{k,l}^{(6+v)} \end{bmatrix},$$

where $P_n \in \{1, 2, 4, 8\}$ represents the number of configured CSI-RS ports over the n-th CSI-RS resource, n=1, ..., N with N representing the number of CSI-RS resources for an aggregated feedback, $\{15, \ldots, 14+P_n\}^n$ represents $P_n$ ports included in the n-th CSI-RS resource and wherein a port number starts with 15, $\tilde{a}_{k,l}^{(14+x,n)}$ represents a complex value, $x=1, \ldots, P_N$, in the (k,l)-th resource element of the (14+x)-th CSI-RS port over the n-th CSI-RS resource. If the total number of CSI-RS ports is 1, then W is 1; otherwise, W represents a pre-coding matrix for reporting a PMI.

Following this assumption, the step in which the user equipment determines the CSI according to the constructed channel matrix includes: for the joint of the plurality of CSI-RS resources, the user equipment determines the pre-coding matrix according to the constructed channel matrix and determines the CSI according to the determined pre-coding matrix. This solution is primarily applicable to a scenario in which the transmission mode of a PDSCH is the Joint Transmission (JT) mode.

Preferably assumed that an overhead of a UERS is the same as that of a recently reported RI when PMI and RI feedbacks are configured, and a PDSCH or a UERS signal $a_{k,l}^{(p)}$ transmitted on UERS antenna port $\{7, \ldots, 6+v\}$ (v represents the number of layers) over the (k,l)-th resource element generates the same result as a signal $\tilde{a}_{k,l}^{(p)}$ transmitted on CSI-RS antenna port $\{\{15, \ldots, 14+P_1\}^1, \{15, \ldots, 14+P_2\}^2, \ldots, \{15, \ldots, 14+P_N\}^N\}$ over the (k,l)-th resource element, that is, $$\begin{bmatrix} \tilde{a}_{k,l}^{(15,1)} \\ \vdots \\ \tilde{a}_{k,l}^{(14+P_N,N)} \end{bmatrix} = W \begin{bmatrix} a_{k,l}^{(7)} \\ \vdots \\ a_{k,l}^{(6+v)} \end{bmatrix},$$

where $P_n \in \{1, 2, 4, 8\}$ represents the number of configured CSI-RS ports over the n-th CSI-RS resource, $n=1, \ldots, N$ with N representing the number of CSI-RS resources for an aggregated feedback, $\{15, \ldots, 14+P_n\}^n$ represents $P_n$ ports included in the n-th CSI-RS resource and wherein a port number starts with 15, $\tilde{a}_{k,l}^{(14+x,n)}$ represents a complex value, $x=1, \ldots, P_N$, in the (k,l)-th resource element of the (14+x)-th CSI-RS port over the n-th CSI-RS resource. If the total number of CSI-RS ports is 1, then W is 1; otherwise, $$W = \begin{bmatrix} W_1 \\ \vdots \\ W_N \end{bmatrix},$$

where $W_n$ represents a pre-coding matrix corresponding to a reported PMI for the n-th CSI-RS resource applied on the (k,l)-th resource element.

Following this assumption, the step in which the user equipment determines the CSI according to the constructed channel matrix includes: the user equipment determines a pre-coding matrix according to the constructed channel matrix for each resource element over the plurality of CSI-RS resources, and determines the CSI according to the determined the pre-coding matrix. This solution is primarily applicable to a scenario in which the transmission mode of the PDSCH is the incoherent JT.

Alternatively assumed that an overhead of a UERS is the same as that of a recently reported RI when PMI and RI feedbacks are configured, and a PDSCH or a UERS signal $a_{k,l}^{(p)}$ transmitted on UERS antenna port $\{7, \ldots, 6+v\}$ (v represents the number of layers) over the (k,l)-th resource element generates the same result as a signal $\tilde{a}_{k,l}^{(p)}$ transmitted on a CSI-RS antenna port $\{\{15, \ldots, 14+P_1\}^1, \{15, \ldots, 14+P_2\}^2, \ldots, \{15, \ldots, 14+P_N\}^N\}$ over the (k,l)-th resource element, that is, $$\begin{bmatrix} \tilde{a}_{k,l}^{(15,1)} \\ \vdots \\ \tilde{a}_{k,l}^{(14+P_N,N)} \end{bmatrix} = W \begin{bmatrix} a_{k,l}^{(7)} \\ \vdots \\ a_{k,l}^{(6+v)} \end{bmatrix},$$

where $P_n \in \{1, 2, 4, 8\}$ represents the number of configured CSI-RS ports over the n-th CSI-RS resource, $n=1, \ldots, N$ with N representing the number of CSI-RS resources for an aggregated feedback, $\{15, \ldots, 14+P_n\}^n$ represents $P_n$ ports included in the n-th CSI-RS resource, a port number starts with 15, $\tilde{a}_{k,l}^{(14+x,n)}$ represents a complex value, $x=1, \ldots, P_N$, in the (k,l)-th resource element of the (14+x)-th CSI-RS port over the n-th CSI-RS resource. If the total number of CSI-RS ports is 1, then W is 1; otherwise, $$W = \begin{bmatrix} W_1 \\ \vdots \\ \varphi_N W_N \end{bmatrix},$$

where $W_n$ represents a pre-coding matrix corresponding to a reported PMI for the n-th CSI-RS resource applied on the (k,l)-th resource element, and $\phi_n$ represents correlation information between the CSI-RS resources and generally correlation information of the n-th CSI-RS resource relative to the 1st CSI-RS resource of the (k,l)-th resource element.

Following this assumption, the step in which the user equipment determines the CSI according to the constructed channel matrix includes: the user equipment determines a pre-coding matrix according to the constructed channel matrix and the correlation information between the plurality of CSI-RS resources for each resource element over the plurality of CSI-RS resources, and determines the CSI according to the determined the pre-coding matrix. This solution is primarily applicable to a scenario in which the transmission mode of the PDSCH is coherent JT.

In contrast to the user equipment side, the base station needs to transmit the control signaling to the user equipment to instruct the user equipment to feed back CSI for the plurality of CSI-RS resources. Reference can be made to the following embodiment for an implementation process thereof.

Figure 2:
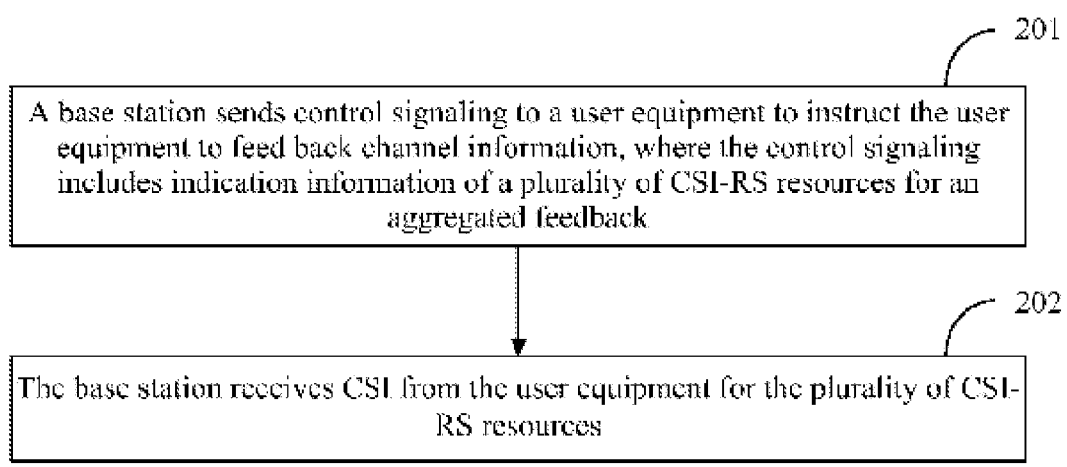
FIG. 2 is a flow chart of a method for transmitting CSI at a base station according to an embodiment of the invention.

Referring to FIG. 2, a flow of a method for transmitting CSI at a base station in the embodiment is as follows:

Step 201: A base station sends control signaling to a user equipment to instruct the user equipment to feed back channel information, where the control signaling includes indication information of a plurality of CSI-RS resources for an aggregated feedback.

Step 202: The base station receives CSI from the user equipment for the plurality of CSI-RS resources.

The CSI received, by the base station, from the user equipment for the plurality of CSI-RS resources is determined according to a preset PDSCH transmission scheme over a CSI reference resource, a correspondence relationship between signals over the plurality of CSI-RS resources and signals on UERS ports and a constructed channel matrix.

The correspondence relationship is $$\begin{bmatrix} \tilde{a}_{k,l}^{(15,1)} \\ \vdots \\ \tilde{a}_{k,l}^{(14+P_N,N)} \end{bmatrix} = W \begin{bmatrix} a_{k,l}^{(7)} \\ \vdots \\ a_{k,l}^{(6+v)} \end{bmatrix},$$

where $a_{k,l}^{(\ )}$ represents a PDSCH or a UERS signal transmitted on UERS antenna port $\{7, \ldots, 6+v\}$ over the (k,l)-th resource element, v represents the number of layers, k represents a sub-carrier index in the frequency domain, and l represents an OFDM symbol index in the time domain, $\tilde{a}_{k,l}^{(\ )}$ represents a signal transmitted on CSI-RS antenna port $\{\{15, \ldots, 14+P_1\}^1, \{15, \ldots, 14+P_2\}^2, \ldots, \{15, \ldots, 14+P_N\}^N\}$ over the (k,l)-th resource element, $\{15, \ldots, 14+P_n\}^n$ represents CSI-RS ports included in the n-th CSI-RS resource, a port number ranges from 15 to $14+P_n$, $P_n$ represents the number of CSI-RS ports included in the n-th CSI-RS resource, N represents the number of CSI-RS resources, and W is 1 or represents a pre-coding matrix corresponding to resource elements of UERS antenna ports.

If the total number of CSI-RS ports over the N CSI-RS resources is 1, then W is 1; otherwise, W represents a pre-coding matrix corresponding to a reported PMI applied on the (k,l)-th resource element.

Preferably $$W = \begin{bmatrix} W_1 \\ \vdots \\ W_N \end{bmatrix},$$

and if the total number of CSI-RS ports over the N CSI-RS resources is 1, then $W_n$ is 1; otherwise, $W_n$ represents a pre-coding matrix corresponding to a reported PMI for the n-th CSI-RS resource applied on the (k,l)-th resource element.

Alternatively $$W = \begin{bmatrix} W_1 \\ \vdots \\ \varphi_N W_N \end{bmatrix},$$

and if the total number of CSI-RS ports over the N CSI-RS resources is 1, then $W_n$ is 1; otherwise, $W_n$ represents a pre-coding matrix corresponding to a reported PMI for the n-th CSI-RS resource applied on the (k,l)-th resource element, and $\varphi_n$ represents correlation information between the CSI-RS resources.

The correlation information between the CSI-RS resources includes phase information and/or amplitude information.

The implementation process of transmitting CSI has been introduced above respectively for the user equipment side and base station side, and an implementation process thereof at both of the sides will be introduced below.

Figure 3:
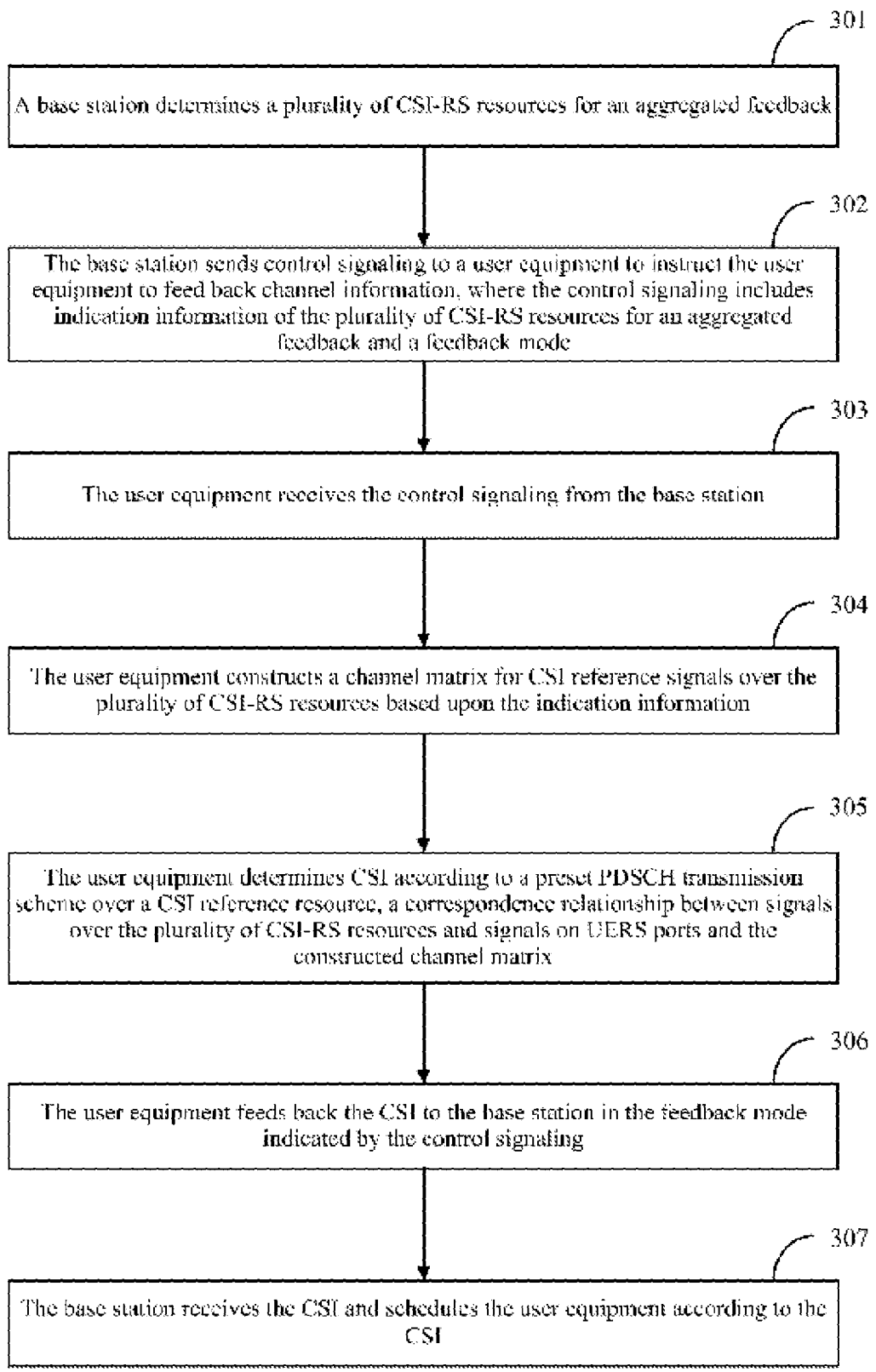
FIG. 3 is a flow chart of a method for transmitting CSI at a user equipment and a base station according to an embodiment of the invention.

Referring to FIG. 3, a flow of a method for transmitting CSI in this embodiment is as follows:

Step 301: A base station determines a plurality of CSI-RS resources for an aggregated feedback.

Step 302: The base station sends control signaling to a user equipment to instruct the user equipment to feed back channel information, where the control signaling includes indication information of the plurality of CSI-RS resources for an aggregated feedback and a feedback mode.

Step 303: The user equipment receives the control signaling from the base station.

Step 304: The user equipment constructs a channel matrix for CSI reference signals over the plurality of CSI-RS resources based upon the indication information.

Step 305: The user equipment determines CSI according to a preset PDSCH transmission scheme over a CSI reference resource, a correspondence relationship between signals over the plurality of CSI-RS resources and signals on UERS ports and the constructed channel matrix.

Step 306: The user equipment feeds back the CSI to the base station in the feedback mode indicated by the control signaling.

The step 307: The base station receives the CSI and schedules the user equipment according to the CSI.

The implementation process of transmitting CSI at the user equipment and the base station has been described, and internal structures of the user equipment and the base station will be introduced below.

Figure 4:
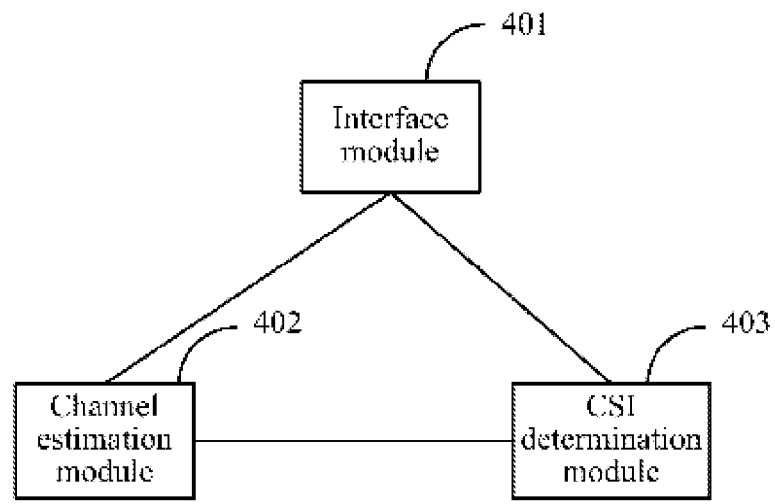
FIG. 4 is a structural diagram of a user equipment according to an embodiment of the invention.

Referring to FIG. 4, a user equipment in this embodiment includes an interface module 401, a channel estimation module 402 and a CSI determination module 403.

The interface module 401 is configured to receive control signaling, from a base station, to instruct the user equipment to feed back channel information, where the control signaling includes indication information of a plurality of CSI-RS resources for an aggregated feedback.

The channel estimation module 402 is configured to perform channel estimation based on the plurality of CSI-RS resources obtained from the indication information and to construct a channel matrix according to a result of channel estimation.

The CSI determination module 403 is configured to determine CSI according to a preset PDSCH transmission scheme over a CSI reference resource, a correspondence relationship between signals over the plurality of CSI-RS resources and signals on UERS ports and the constructed channel matrix, and to instruct the interface module to transmit the CSI to the base station.

The CSI determination module 403 is configured to determine a pre-coding matrix according to the preset PDSCH transmission scheme over the CSI reference resource, the correspondence relationship $$\begin{bmatrix} \tilde{a}_{k,l}^{(15,1)} \\ \vdots \\ \tilde{a}_{k,l}^{(14+P_N,N)} \end{bmatrix} = W \begin{bmatrix} a_{k,l}^{(7)} \\ \vdots \\ a_{k,l}^{(6+v)} \end{bmatrix}$$

between signals over the plurality of CSI-RS resources and signals on UERS ports and the constructed channel matrix, and to determine the CSI according to the determined pre-coding matrix, where $a_{k,l}^{(\ )}$ represents a PDSCH or a UERS signal transmitted on UERS antenna port $\{7, \ldots, 6+v\}$ over the (k,l)-th resource element, v represents the number of layers, k represents a sub-carrier index in the frequency domain, and l represents an OFDM symbol index in the time domain, $\tilde{a}_{k,l}^{(\ )}$ represents a signal transmitted on CSI-RS antenna port $\{\{15, \ldots, 14+P_1\}^1, \{15, \ldots, 14+P_2\}^2, \ldots, \{15, \ldots, 14+P_N\}^N\}$ over the (k,l)-th resource element, $\{15, \ldots, 14+P_n\}^n$ represents CSI-RS ports included in the n-th CSI-RS resource, a port number ranges from 15 to 14+$P_n$, $P_n$ represents the number of CSI-RS ports included in the n-th CSI-RS resource, N represents the number of CSI-RS resources, and W is 1 or represents a pre-coding matrix corresponding to resource elements of UERS antenna ports.

If the total number of CSI-RS ports over the N CSI-RS resources is 1, then W is 1; otherwise, W represents a pre-coding matrix corresponding to a reported PMI applied on the (k,l)-th resource element.

Preferably $$W = \begin{bmatrix} W_1 \\ \vdots \\ W_N \end{bmatrix},$$

and if the total number of CSI-RS ports over the N CSI-RS resources is 1, then $W_n$ is 1; otherwise, $W_n$ represents a pre-coding matrix corresponding to a reported PMI for the n-th CSI-RS resource applied on the (k,l)-th resource element.

Alternatively $$W = \begin{bmatrix} W_1 \\ \vdots \\ \varphi_N W_N \end{bmatrix},$$

and if the total number of CSI-RS ports over the N CSI-RS resources is 1, then $W_n$ is 1; otherwise, $W_n$ represents a pre-coding matrix corresponding to a reported PMI for the n-th CSI-RS resource applied on the (k,l)-th resource element, and $\phi_n$ represents correlation information between the CSI-RS resources of the (k,l)-th resource element.

Where the correlation information between the CSI-RS resources includes phase information and/or amplitude information.

Figure 5:
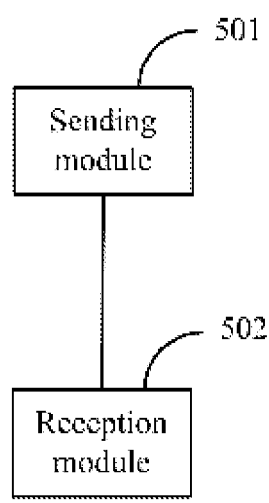
FIG. 5 is a structural diagram of a base station according to an embodiment of the invention.

Referring to FIG. 5, a base station in this embodiment includes a sending module 501 and a reception module 502.

The sending module 501 is configured to send control signaling to a user equipment to instruct the user equipment to feed back channel information, where the control signaling includes indication information of a plurality of CSI-RS resources for an aggregated feedback; and The reception module 502 is configured to receive CSI from the user equipment for the plurality of CSI-RS resources.

The CSI received, by the reception module 502, from the user equipment for the plurality of CSI-RS resources is determined according to a preset PDSCH transmission scheme over a CSI reference resource, a correspondence relationship between signals over the plurality of CSI-RS resources and signals on UERS ports and a constructed channel matrix.

The correspondence relationship is $$\begin{bmatrix} \tilde{a}_{k,l}^{(15,1)} \\ \vdots \\ \tilde{a}_{k,l}^{(14+P_N,N)} \end{bmatrix} = W \begin{bmatrix} a_{k,l}^{(7)} \\ \vdots \\ a_{k,l}^{(6+v)} \end{bmatrix},$$

where $a_{k,l}^{(\cdot)}$ represents a PDSCH or a UERS signal transmitted on UERS antenna port $\{7, \ldots, 6+v\}$ over the (k,l)-th resource element, v represents the number of layers, k represents a sub-carrier index in the frequency domain, and l represents an OFDM symbol index in the time domain, $\tilde{a}_{k,l}^{(\cdot)}$ represents a signal transmitted on CSI-RS antenna port $\{\{15, \ldots, 14+P_1\}^1, \{15, \ldots, 14+P_2\}^2, \ldots, \{15, \ldots, 14+P_N\}^N\}$ over the (k,l)-th resource element, $\{15, \ldots, 14+P_n\}^n$ represents CSI-RS ports included in the n-th CSI-RS resource, a port number ranges from 15 to 14+$P_n$, $P_n$ represents the number of CSI-RS ports included in the n-th CSI-RS resource, N represents the number of CSI-RS resources, and W is 1 or represents a pre-coding matrix corresponding to resource elements of UERS antenna ports.

If the total number of CSI-RS ports over the N CSI-RS resources is 1, then W is 1; otherwise, W represents a pre-coding matrix corresponding to a reported PMI applied on the (k,l)-th resource element.

Preferably $$W = \begin{bmatrix} W_1 \\ \vdots \\ W_N \end{bmatrix},$$

and if the total number of CSI-RS ports over the N CSI-RS resources is 1, then $W_n$ is 1; otherwise, $W_n$ represents a pre-coding matrix corresponding to a reported PMI for the n-th CSI-RS resource applied on the (k,l)-th resource element.

Alternatively $$W = \begin{bmatrix} W_1 \\ \vdots \\ \varphi_N W_N \end{bmatrix},$$

and if the total number of CSI-RS ports over the N CSI-RS resources is 1, then $W_n$ is 1; otherwise, $W_n$ represents a pre-coding matrix corresponding to a reported PMI for the n-th CSI-RS resource applied on the (k,l)-th resource element, and $\phi_n$ represents correlation information between the CSI-RS resources.

The correlation information between the CSI-RS resources includes phase information and/or amplitude information.

In the embodiment of the invention, initially assumed that PMI and RI feedbacks are configured, and a PDSCH or a UERS signal $a_{k,l}^{(p)}$ transmitted in the (k,l)-th resource element over a UERS resource generates the same result as a signal $\tilde{a}_{k,l}^{(p)}$ transmitted in the (k,l)-th resource element over a CSI-RS resource. Following this assumption, a user equipment in the embodiment of the invention constructs a channel matrix for a plurality of CSI-RS resources other than performing channel measurement on the CSI-RS resources as in the prior art. Moreover in the embodiment, CSI is determined according to the channel matrix and reported to thereby support transmission of channel state information in CoMP transmission.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for transmitting Channel State Information, CSI, comprising:
   receiving, by a user equipment, control signaling, from a base station, to instruct the user equipment to feed back channel information, wherein the control signaling includes indication information of a plurality of Channel State Information-Reference Signal, CSI-RS, resources for an aggregated feedback;
   performing, by the user equipment, channel estimation based on the plurality of CSI-RS resources obtained from the indication information and constructing a channel matrix according to a result of channel estimation; and
   determining, by the user equipment, CSI according to a preset Physical Downlink Shared Channel, PDSCH, transmission scheme over a CSI reference resource, a correspondence relationship between signals over the plurality of CSI-RS resources and signals on UERS ports and the constructed channel matrix, and transmitting the CSI to the base station;
   wherein determining by the user equipment the CSI according to the preset PDSCH transmission scheme over the CSI reference resource, the correspondence relationship between signals over the plurality of CSI-RS resources and signals on UERS ports and the constructed channel matrix comprises:
   determining, by the user equipment, a pre-coding matrix according to the preset PDSCH transmission scheme over the CSI reference resource, the correspondence relationship $$\begin{bmatrix} \tilde{a}_{k,l}^{(15,1)} \\ \vdots \\ \tilde{a}_{k,l}^{(14+P_N,N)} \end{bmatrix} = W \begin{bmatrix} a_{k,l}^{(7)} \\ \vdots \\ a_{k,l}^{(6+v)} \end{bmatrix}$$

between signals over the plurality of CSI-RS resources and signals on UERS ports and the constructed channel matrix, and determining the CSI according to the determined pre-coding matrix, wherein $a_{k,l}^{(\cdot)}$ represents a PDSCH or a UERS signal transmitted on UERS antenna port $\{7, \ldots, 6+v\}$ over the (k,l)-th resource element, $v$ represents the number of layers, k represents a sub-carrier index in frequency domain, and l represents an Orthogonal Frequency Division Multiplexing, OFDM, symbol index in time domain, $\tilde{a}_{k,l}^{(\cdot)}$ represents a signal transmitted on CSI-RS antenna port $\{\{15, \ldots, 14+P_1\}^1, \{15, \ldots, 14+P_2\}^2, \ldots, \{15, \ldots, 14+P_N\}^N\}$ over the (k,l)-th resource element, $\{15, \ldots, 14+P_n\}^n$ represents CSI-RS ports included in the n-th CSI-RS resource, a port number ranges from 15 to $14+P_n$, $P_n$ represents the number of CSI-RS ports included in the n-th CSI-RS resource, N represents the number of CSI-RS resources, and W is 1 or represents a pre-coding matrix corresponding to resource elements of UERS antenna ports.

2. The method according to claim 1, wherein if the total number of CSI-RS ports over the N CSI-RS resources is 1, then W is 1; otherwise, W represents a pre-coding matrix corresponding to a reported Pre-coding Matrix Indicator, PMI, applied on the (k,l)-th resource element.

3. The method according to claim 1, wherein $$W = \begin{bmatrix} W_1 \\ \vdots \\ W_N \end{bmatrix},$$

and if the total number of CSI-RS ports over the N CSI-RS resources is 1, then $W_n$ is 1; otherwise, $W_n$ represents a pre-coding matrix corresponding to a reported PMI for the n-th CSI-RS resource applied on the (k,l)-th resource element.

4. The method according to claim 1, wherein $$W = \begin{bmatrix} W_1 \\ \vdots \\ \varphi_N W_N \end{bmatrix},$$

and if the total number of CSI-RS ports over the N CSI-RS resources is 1, then $W_n$ is 1; otherwise, $W_n$ represents a pre-coding matrix corresponding to a reported PMI for the n-th CSI-RS resource applied on the (k,l)-th resource element, and $\varphi_n$ represents correlation information between the CSI-RS resources of the (k,l)-th resource element.

5. The method according to claim 4, wherein the correlation information between the CSI-RS resources comprises phase information and/or amplitude information.

6. A method for transmitting CSI, comprising:
sending, by a base station, control signaling to a user equipment to instruct the user equipment to feed back channel information, wherein the control signaling includes indication information of a plurality of CSI-RS resources for an aggregated feedback; and
receiving, by the base station, CSI from the user equipment for the plurality of CSI-RS resources;
wherein the CSI received, by the base station, from the user equipment for the plurality of CSI-RS resources is determined according to a preset PDSCH transmission scheme over a CSI reference resource, a correspondence relationship between signals over the plurality of CSI-RS resources and signals on UERS ports and a constructed channel matrix; and
the correspondence relationship is $$\begin{bmatrix} \tilde{a}_{k,l}^{(15,1)} \\ \vdots \\ \tilde{a}_{k,l}^{(14+P_N,N)} \end{bmatrix} = W \begin{bmatrix} a_{k,l}^{(7)} \\ \vdots \\ a_{k,l}^{(6+v)} \end{bmatrix},$$

wherein $a_{k,l}^{(\ )}$ represents a PDSCH or a UERS signal transmitted on UERS antenna port $\{7, \ldots, 6+v\}$ over the (k,l)-th resource element, v represents the number of layers, k represents the sub-carrier index in frequency domain, and l represents the Orthogonal Frequency Division Multiplexing, OFDM, symbol index in time domain, $\tilde{a}_{k,l}^{(\ )}$ represents a signal transmitted on CSI-RS antenna port $\{\{15, \ldots, 14+P_1\}^1, \{15, \ldots, 14+P_2\}^2, \ldots, \{15, \ldots, 14+P_N\}^N\}$ over the (k,l)-th resource element, $\{15, \ldots, 14+P_n\}^n$ represents CSI-RS ports included in the n-th CSI-RS resource, a port number ranges from 15 to $14+P_n$, $P_n$ represents the number of CSI-RS ports included in the n-th CSI-RS resource, N represents the number of CSI-RS resources, and W is 1 or represents a pre-coding matrix corresponding to resource elements of UERS antenna ports.

7. The method according to claim 6, wherein if the total number of CSI-RS ports over the N CSI-RS resources is 1, then W is 1; otherwise, W represents a pre-coding matrix corresponding to a reported PMI applied on the (k,l)-th resource element.

8. The method according to claim 6, wherein $$W = \begin{bmatrix} W_1 \\ \vdots \\ W_N \end{bmatrix},$$

and if the total number of CSI-RS ports over the N CSI-RS resources is 1, then $W_n$ is 1; otherwise, $W_n$ represents a pre-coding matrix corresponding to a reported PMI for the n-th CSI-RS resource applied on the (k,l)-th resource element.

9. The method according to claim 6, wherein $$W = \begin{bmatrix} W_1 \\ \vdots \\ \varphi_N W_N \end{bmatrix},$$

and if the total number of CSI-RS ports over the N CSI-RS resources is 1, then $W_n$ is 1; otherwise, $W_n$ represents a pre-coding matrix corresponding to a reported PMI for the n-th CSI-RS resource applied on the (k,l)-th resource element, and $\varphi_n$ represents correlation information between the CSI-RS resources of the (k,l)-th resource element.

10. The method according to claim 9, wherein the correlation information between the CSI-RS resources comprises phase information and/or amplitude information.

11. A user equipment, comprising:
an interface module configured to receive control signaling, from a base station, to instruct the user equipment to feed back channel information, wherein the control signaling includes indication information of a plurality of CSI-RS resources for an aggregated feedback;
a channel estimation module configured to perform channel estimation based on the plurality of CSI-RS resources obtained from the indication information and to construct a channel matrix according to a result of channel estimation;
a CSI determination module configured to determine CSI according to a preset Physical Downlink Shared Channel, PDSCH, transmission scheme over a CSI reference resource, a correspondence relationship between signals over the plurality of CSI-RS resources and signals on UERS ports and the constructed channel matrix, and to instruct the interface module to transmit the CSI to the base station;
wherein the CSI determination module is configured to determine a pre-coding matrix according to the preset PDSCH transmission scheme over the CSI reference resource, the correspondence relationship $$\begin{bmatrix} \tilde{a}_{k,l}^{(15,1)} \\ \vdots \\ \tilde{a}_{k,l}^{(14+P_N,N)} \end{bmatrix} = W \begin{bmatrix} a_{k,l}^{(7)} \\ \vdots \\ a_{k,l}^{(6+v)} \end{bmatrix}$$

between signals over the plurality of CSI-RS resources and signals on UERS ports and the constructed channel matrix and to determine the CSI according to the determined pre-coding matrix, wherein $a_{k,l}^{(\ )}$ represents a PDSCH or a UERS signal transmitted on UERS antenna port $\{7, \ldots, 6+v\}$ over the (k,l)-th resource element, v represents the number of layers, k represents a sub-carrier index in frequency domain, and l represents an OFDM symbol index in time domain, $\tilde{a}_{k,l}^{(\ )}$ represents a signal transmitted on CSI-RS antenna port $\{\{15, \ldots, 14+P_1\}^1, \{15, \ldots, 14+P_2\}^2, \ldots, \{15, \ldots, 14+P_N\}^N\}$ over the (k,l)-th resource element, $\{15, \ldots, 14+P_n\}^n$ represents CSI-RS ports included in the n-th CSI-RS resource, a port number ranges from 15 to $14+P_n$, $P_n$ represents the number of CSI-RS ports included in the n-th CSI-RS resource, N represents the number of CSI-RS resources, and W is 1 or represents a pre-coding matrix corresponding to resource elements of UERS antenna ports.

12. The user equipment according to claim 11, wherein if the total number of CSI-RS ports over the N CSI-RS resources is 1, then W is 1; otherwise, W represents a pre-coding matrix corresponding to a reported PMI applied on the (k,l)-th resource element.

13. The user equipment according to claim 11, wherein $$W = \begin{bmatrix} W_1 \\ \vdots \\ W_N \end{bmatrix},$$

and if the total number of CSI-RS ports over the N CSI-RS resources is 1, then $W_n$ is 1; otherwise, $W_n$ represents a pre-coding matrix corresponding to a reported PMI for the n-th CSI-RS resource applied on the (k,l)-th resource element.

14. The user equipment according to claim 11, wherein $$W = \begin{bmatrix} W_1 \\ \vdots \\ \varphi_N W_N \end{bmatrix},$$

and if the total number of CSI-RS ports over the N CSI-RS resources is 1, then $W_n$ is 1; otherwise $W_n$ represents a pre-coding matrix corresponding to a reported PMI for the n-th CSI-RS resource applied on the (k,l)-th resource element, and $\phi_n$ represents correlation information between the CSI-RS resources of the (k,l)-th resource element.

15. The user equipment according to claim 14, wherein the correlation information between the CSI-RS resources comprises phase information and/or amplitude information.

* * * * *